United States Patent [19]
Chennakeshu et al.

[11] Patent Number: 5,918,174
[45] Date of Patent: Jun. 29, 1999

[54] CIRCUITRY AND METHOD FOR INITIATING COMMUNICATION BETWEEN COMMUNICATION STATIONS OF A RADIO COMMUNICATION SYSTEM

[75] Inventors: Sandeep Chennakeshu, Cary; Yi-Pin Eric Wang, Raleigh; Kumar Balachandran, Cary, all of N.C.

[73] Assignee: Ericsson, Inc., Research Triangle Park, N.C.

[21] Appl. No.: 08/626,182

[22] Filed: Mar. 29, 1996

[51] Int. Cl.⁶ .................................................. H04B 7/185
[52] U.S. Cl. .................... 455/427; 455/12.1; 455/13.4; 455/505; 455/522; 455/69; 455/63
[58] Field of Search .................... 455/434, 427, 455/13.4, 12.1, 69, 522, 422, 13.1, 70, 9–10, 504–505, 515, 517, 524–525, 59, 61, 63, 67.1, 68; 370/310, 318

[56] References Cited

U.S. PATENT DOCUMENTS

| | | | |
|---|---|---|---|
| 5,278,992 | 1/1994 | Su et al. | 455/69 |
| 5,343,512 | 8/1994 | Wang et al. | 455/12.1 |
| 5,404,569 | 4/1995 | Schwendeman et al. | 455/13.4 |
| 5,465,399 | 11/1995 | Oberholtzer | 455/69 |
| 5,553,316 | 9/1996 | Diepstraten et al. | 455/69 |

FOREIGN PATENT DOCUMENTS

| | | |
|---|---|---|
| 2 287 383 | 9/1995 | United Kingdom. |
| WO 81/00034 | 1/1981 | WIPO. |
| WO 91/09473 | 6/1991 | WIPO. |
| WO 96/08941 | 3/1996 | WIPO. |
| WO 96/14716 | 5/1996 | WIPO. |

*Primary Examiner*—Doris H. To
*Attorney, Agent, or Firm*—Jenkens & Gilchrist, P.C.

[57] ABSTRACT

A method and associated circuitry for initiating communication between a network station and a user terminal of a radiotelephonic communication system, such as a satellite-cellular communication system. When communication is to be initiated, a paging signal is transmitted by a network station to the user terminal. When the user terminal detects the paging signal, an acknowledgment signal is generated by the user terminal and encoded to increase the margin of the acknowledgment signal. An increased-margin acknowledgment signal acknowledging reception of the paging signal is transmitted to facilitate communication of the acknowledgment signal back to the network station.

19 Claims, 3 Drawing Sheets

PAGING SEQUENCE DIAGRAM

RECEPTION OF ACKNOWLEDGEMENT

CIRCUITRY AND METHOD FOR INITIATING COMMUNICATION BETWEEN COMMUNICATION STATIONS OF A RADIO COMMUNICATION SYSTEM

The present invention relates generally to radiotelephonic communication systems such as a terrestrial-cellular communication system or a satellite-cellular communication system. More particularly, the present invention relates to circuitry, and an associated methodology, for initiating communications with a user terminal, i.e., a radiotelephone, operable in such a radiotelephonic communication system.

To initiate communications with the user terminal, a paging signal is transmitted to the user terminal to page the user terminal. When the user terminal receives the paging signal, the user terminal returns an acknowledgment signal acknowledging reception of the paging signal. The user terminal might be operating in an environment in which the acknowledgment signal might be significantly attenuated. The possibility of significant levels of attenuation which prevent adequate communication of the acknowledgment signal is particularly problematical when the user terminal is operable in a satellite-cellular communication system, and the acknowledgment signal must be transmitted over a significant distance to a satellite-based transceiver. To facilitate communication of the acknowledgment signal, the "margin" of the acknowledgment signal is increased to distinguish better the acknowledgment signal over background noise. As the power level of the user terminal is limited and cannot normally be increased, the margin of the acknowledgment signal cannot be increased by increasing its power level. Instead, by encoding the acknowledgment signal according to a selected encoding technique, the margin of the acknowledgment signal is increased. Thereby, communication of the acknowledgment signal is facilitated. By acknowledging reception of the paging signal, repeated transmission of paging signals to the user terminal, once the radio telephone has received the paging signal, is avoided. And, if an acknowledgment signal is not detected, the paging signal is retransmitted at a higher margin level, such as by increasing the power level of the paging signal or by encoding the paging signal according to a different encoding scheme or a combination thereof.

BACKGROUND OF THE INVENTION

A communication system is formed, at a minimum, of a transmitter and a receiver interconnected by a communication channel. The communication system is operable at least to transmit communication signals, having an informational content, generated at, or applied to, the transmitter. The communication signals are transmitted to the receiver through the communication channel. The receiver is operable to receive the transmitted, communication signal and to recreate the informational content of the communication signal.

A radio communication system is a communication system in which the communication channel is formed of one or more frequency bands of the electromagnetic frequency spectrum. A transmitter operable in a radio communication system generates a communication signal of characteristics permitting its transmission through the communication channel, and the receiver operable in the radio communication system permits reception of the communication signal transmitted through the communication channel.

Typically, the radio receiver includes tuning circuitry tunable to the frequencies of the communication channel through which the communication signal is transmitted, down-conversion circuitry for down-converting a receive signal formed of the communication signal from a transmission frequency into a lower frequency signal, demodulation, and decoder circuitry which permit the informational content of the communication signal to be recreated.

A radio communication system is advantageous for the reason that a fixed, or hard-wired, connection is not required to form the communication channel extending between the transmitter and receiver. Communication can be effectuated between remotely-positioned transmitters and receivers without the need to form the hard-wired or other fixed connections therebetween.

A cellular communication system is a type of radio communication system. When the infrastructure, hereinafter referred to as the network, of the cellular communication system is installed in a geographical area, a subscriber to the cellular system is generally able to communicate telephonically in the system when positioned at any location in the geographical area encompassed by the system.

Cellular communication networks have been installed throughout significant portions of at least many of the world's population centers. Large numbers of subscribers to cellular communication systems formed of such cellular networks are able to communicate telephonically when positioned in areas encompassed by such cellular networks.

However, in some areas, such as areas not proximate to population centers, conventional, i.e., terrestrial, cellular communication networks have not been installed. In areas of low population density, for instance, a terrestrial-cellular communication network might not be commercially viable and is not installed.

The terrestrial-cellular communication networks which have already been installed have also been constructed pursuant to various different standards. A user terminal operable in one of the cellular communication systems is sometimes not operable in others of the cellular communication systems.

Therefore, even in an area in which a cellular communication network has been installed, a user might not be able to communicate by way of the cellular communication network if the user attempts to utilize a user terminal constructed to be operable only with another one of the cellular communication networks.

Satellite-cellular communication systems have been proposed which, when implemented, shall permit a user, utilizing a user terminal operable therein, to communicate telephonically by way of the satellite-cellular communication system when positioned at almost any location. By transmitting down-link and signals between a satellite-based transceiver and the user terminal and up-link signals between the user terminal and the satellite-based transceiver, telephonic communication shall be possible between the user terminal and the satellite-based transceiver. By effectuating additional communication links between the satellite-based transceiver and a ground station, the user of the user terminal shall be able to communicate telephonically with another party by way of the ground station and the satellite-based transceiver.

Numerous technical obstacles must be overcome in order to implement a workable, satellite-cellular communication system. For instance, the user terminal must be capable of transmitting communication signals to a satellite-based transceiver orbiting the Earth at a distance of perhaps thousands of kilometers above the Earth's surface.

Also, costs associated with placing the satellite-based transceiver in orbit are quite significant, and the satellite-cellular communication systems are being designed in ways to minimize the number of satellite-based transceivers required of such a system while still providing a worldwide coverage area. Supervisory communications between the satellite-based transceiver and a user terminal should therefore be minimized.

When a call is to be placed to a user terminal, for instance, supervisory communication signals are first transmitted to the user terminal. The user terminal must be informed of the call placement so that, inter alia, the user terminal can be tuned to a proper communication channel to receive and to transmit communication signals pursuant to the call.

To initiate the communications, a network station, either the satellite-based transceiver, or in a terrestrial-cellular communication system, a base station, transmits a paging signal to the user terminal. Repeated transmission of a paging signal might unnecessarily occur if the network station fails to receive timely indications of reception by the user terminal of the paging signal.

The paging signal must be of a "margin" great enough for the user terminal to detect the signal. The margin of the signal is the amount of power of the signal available to a receiver over a nominal level that permits adequate detection by the receiver of the signal over Gaussian noise levels. The margin of a signal is sometimes expressed in terms of decibels (dB) over a noise level. The margin of a signal can be increased by increasing its power level, by encoding the signal, and by repeating the signal. An acknowledgment signal can be generated by the user terminal to acknowledge its receipt of the paging signal. Analogous to the margin required of the paging signal, the acknowledgment signal must be of a margin great enough for the network station to detect the signal.

As the user terminal is of a limited power capacity, the power level of an acknowledgment signal transmitted by the user terminal to the network station cannot be increased indiscriminately to increase the margin of the acknowledgment signal. Therefore, when the communications must be effectuated upon a transmission channel exhibiting a high level of attenuation, the acknowledgment signal might not be able to be adequately communicated to the network station.

What is needed, therefore, is a manner by which to minimize the number of paging signals required to be transmitted by a network station to initiate communications between a network station and a user terminal. What is also needed, therefore, is a manner by which to acknowledge, with a high margin signal, reception of a paging signal at a user terminal.

It is in light of this background information related to communications pursuant to a radiotelephonic communication system, such as a satellite-based or terrestrial-based cellular communication system, that the significant improvements of the present invention have evolved.

SUMMARY OF THE INVENTION

The present invention advantageously provides circuitry, and an associated methodology, for initiating communications with a user terminal operable in a radiotelephonic communication system.

Transmission of paging signals required to initiate communications with the user terminal are minimized. A paging signal is transmitted by a network station to page the user terminal. When the user terminal receives the paging signal, the user terminal returns an acknowledgment signal acknowledging reception of the paging signal.

As the user terminal might be operating in an environment in which the acknowledgment signal might be significantly attenuated, the margin of the acknowledgment signal is increased by encoding the acknowledgment signal pursuant to a selected encoding technique. The margin of the acknowledgment signal is thereby increased without increasing the power level at which the acknowledgment signal must be transmitted by the user terminal.

The communication bandwidth required of the network station to initiate the communications with the user terminal is minimized. The present invention is advantageously embodied in both a terrestrial-cellular communication system and a satellite-cellular communication system. Repeated paging of the user terminal is avoided. And, if no acknowledgment signal is detected by the network station, the margin level of paging signals generated by the network station is increased to increase the probability of successful communication of the paging signals to the user terminal. The margin level is increased, e.g., by increasing the power level of the signal or by encoding the signal with a more robust encoding scheme.

In one aspect of the present invention, communication in a cellular satellite communication system having at least a satellite-based transceiver and a user terminal is initiated. The user terminal is paged with a paging signal transmitted by the satellite-based transceiver. An acknowledgment signal generated at the user terminal is returned to the satellite-based transceiver to acknowledge reception by the user terminal of the paging signal.

In another aspect of the present invention, a paging signal is transmitted upon a forward-link channel at a first power level. The paging signal includes a power level indicating portion for indicating the power level at which the paging signal is transmitted. If reception of the paging signal is not acknowledged within a selected time period, the paging signal is retransmitted at an increased power level, thereby to increase the probability of successful communication of the paging signal. Alternatively, the paging signal is re-encoded by an encoding scheme of increased robustness, or the margin of the paging signal is increased in some other manner and then retransmitted.

In these and other aspects, therefore, a communication initiation method, and associated circuitry, initiates communication by a first radio communication station with a second radio communication station. A paging signal is transmitted from the first radio communication station upon a forward-link channel. The paging signal is transmitted at a first margin level, and the paging signal includes a margin level indicating portion for indicating the margin level at which the paging signal is transmitted. The paging signal is retransmitted from the first radio communication station upon the forward-link channel if the second radio communication station fails to acknowledge reception of the paging signal within a selected time period. The paging signal is retransmitted at a second margin level wherein the second margin level is greater than the first margin level. The retransmitted paging signal again includes the margin level indicating portion for indicating the margin level at which the paging signal is retransmitted.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
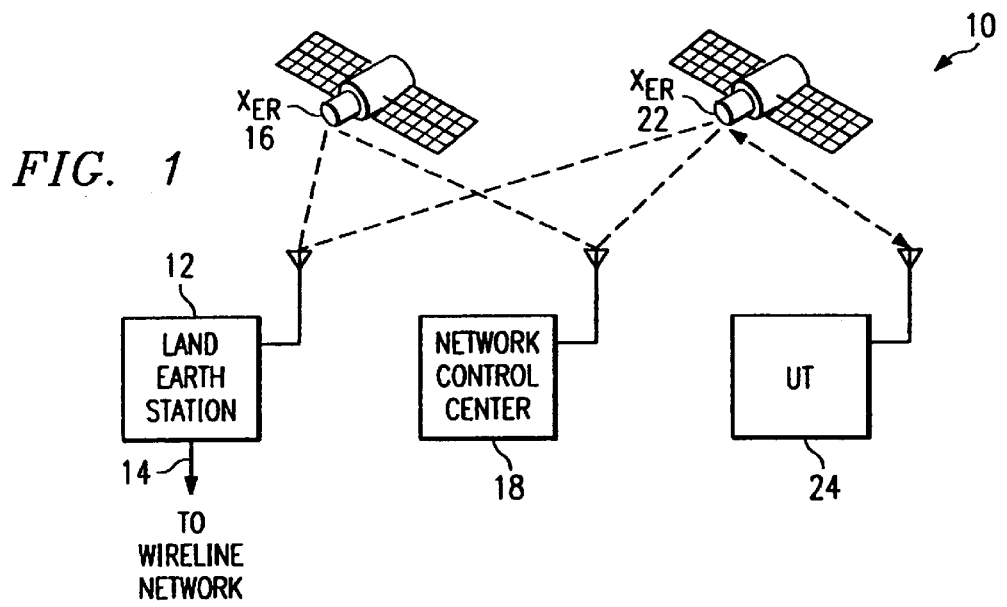
FIG. 1 illustrates a functional block diagram of a satellite-cellular communication system which embodies the circuitry and method of an embodiment of the present invention.

Referring first to FIG. 1, a satellite-cellular communication system, shown generally at 10, includes the circuitry, and associated methodology, of an embodiment of the present invention. It should be noted at the outset that, while the communication system 10 is illustrated to be a satellite-cellular communication system, the present invention can analogously be embodied in a terrestrial-cellular, or other radiotelephonic, communication system. For instance, as one skilled in the art shall appreciate, by appropriate substitution of terrestrial-based base stations for certain of the satellite-based transceivers of a satellite-cellular communication system, a terrestrial-cellular communication system can instead be formed.

The communication system 10 includes a land Earth station 12 which is coupled, here represented by lines 14, to a wireline telephonic network. The land Earth station 12 includes transceiver circuitry for transceiving communication signals, inter alia, with a satellite-based transceiver 16.

The satellite-based transceiver 16 is operable to transceive communication signals not only with the land Earth station 12 but also with other land-based devices, such as transceiver circuitry of a network control center 18. The transceiver 16 is primarily operable as a relay to relay signals generated at the land Earth station 12 to the network control center 18 and vice-versa. The transceiver is preferably able to receive signals on any frequency channel and relay the signal on another frequency channel.

The transceiver circuitry of the network control center 18, in turn, is able to transceive communication signals with other satellite-based transceivers, such as the transceiver 22. The transceiver 22, similar to the transceiver 16, is able to transceive communication signals with land-based transceivers including, for example, a user terminal 24. Analogous to the transceiver 16, the transceiver 22 is primarily operable as a relay to relay signals transmitted thereto. The transceiver circuitry of the illustrated devices each include a plurality of transceiving elements to permit concurrent communication between large numbers of communication stations.

Communication pursuant to a satellite-cellular communication system, such as the system 10 shown in FIG. 1, permits a user of a user terminal, such as user terminal 24, to communicate telephonically when positioned at any location throughout large areas of the world. As long as the user of the user terminal 24 is positioned to permit transmission and reception of communication signals with a satellite-based transceiver, such as one of the transceivers 16 and 22, the user is able to communicate telephonically with a user of another user terminal or to a telephonic device of a conventional, wireline network. Because of the almost-worldwide scope permitted of a satellite-cellular communication system, the user of the user terminal 24 need not be concerned with the compatibility of the user terminal with a local, cellular system. The user is further capable of communicating telephonically in an area which does not otherwise have an installed cellular, or wireline, telephonic network.

For instance, when the land Earth station 12 (i.e., a telephone device coupled thereto) initiates a call to the user terminal 24, an indication of the initiation is provided to the network control center 18 by way of the transceiver 16. The network control center generates control signals, including paging signals, which are provided to the terminal 24 by way of the transceiver 22. Once call set-up is successfully completed, voice channels between the land Earth station and the user terminal are defined to permit two-way communication between the land Earth station and the user terminal, by way of the transceiver 22.

As mentioned previously, power limitations limit the maximum power levels at which signals generated by a user terminal can be transmitted, significant distances separate satellite-based transceivers and the user terminals, and significant expenses are required to be expended to position the satellite-based transceivers in orbit. Communication systems that are being developed are being developed in manners which attempt to minimize the bandwidth required to communicate communication signals and to increase the margin of signals generated by the user terminals operable in such communication systems.

For instance, when a call is to be placed to a user terminal, supervisory and control signals must first be sent to the terminal. Such signals are transmitted, for example, to inform the user terminal of the incoming call and to cause the user terminal to be tuned to transceive communication signals pursuant to such call. Included amongst the supervisory and control signals transmitted to the user terminal is a paging signal to alert the user terminal of the incoming call. When the user terminal is paged, the user terminal might not be positioned to receive the paging signal. The paging signal must be repeated in such instances so that the user terminal receives the paging signal. Co-pending, commonly-assigned patent application Ser. No. 08/559,692 filed on Nov. 15, 1995 relating to transmission techniques for high penetration short message service discloses a paging scheme which facilitates paging of a user terminal when the paging signal is subjected to significant amounts of attenuation. The contents of such application are hereby incorporated herein by reference.

During operation of an embodiment of the present invention, when a user terminal, such as the user terminal 24, receives a paging signal, either transmitted on a regular paging channel or a high penetration short message service channel, such as that disclosed in the aforementioned disclosure, the user terminal acknowledges reception of the paging signal with an acknowledgment signal.

The margin of the acknowledgment signal is increased by encoding the acknowledgment signal to facilitate better the communication of the acknowledgment signal. If the acknowledgment signal is not received within a selected time period, a paging signal is again generated by the communication system, but at an increased power level. In such manner, redundant paging signals are not generated in the event that the user terminal receives the paging signal and the margin of the paging signal is increased by increasing its power level when the paging signal is not acknowledged to have been received by the user terminal. The paging signal may alternatively first be encoded to increase its margin.

Figure 2:
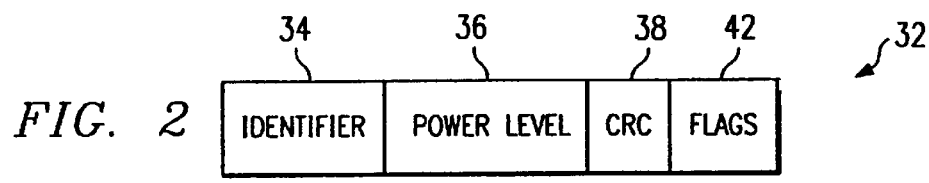
FIG. 2 illustrates information contained in a paging signal which is utilized during operation of an embodiment of the present invention.

FIG. 2 illustrates the information contained in a paging signal, here shown generally at 32, transmitted during operation of the communication system 10 to page a user terminal.

The paging signal is transmitted upon a paging channel, PCH, which in one communication protocol is of a signal length of four bursts, each burst being formed of one hundred fifty-six bits. As also described in the aforementioned, co-pending patent application, a high-margin, high penetration short message service signal can instead be utilized to page a user terminal. The informational content of a paging signal transmitted either upon a normal paging channel or a channel upon which the high penetration short message service signal is transmitted is similar.

The paging signal 32 illustrated in the figure includes a user terminal identifier code 34. The identifier code is of a value which uniquely identifies a user terminal, such as the user terminal 24 shown in FIG. 1. The identifier 34 may, for instance, be formed of a Temporary Mobile Subscriber Identity (TMSI) or International Mobile Subscriber Identity (IMSI) value defined in an ASEAN cellular satellite communication system. When a user terminal receives a paging signal, the value of the identifier 34 identifies the user terminal which is being paged.

The paging signal 32 further includes a power level indicator 36. The power level indicator 36 indicates the power level at which the paging signal is transmitted. As shall be noted below, in one embodiment of the present invention, the power level of the paging signal can be selected to be of at least two power levels. The power level indicator formed of at least a one-bit code, provides an indication to a user terminal receiving the paging signal the power level at which the paging signal is transmitted. In another embodiment, the paging signal includes an indicator for indicating the encoding scheme used to encode the paging signal, and the paging signal can be encoded by at least two encoding schemes. Alternatively, the encoding scheme may itself be used as the indicator.

The paging signal 32 further includes coding bits 38, here cyclic redundancy code, CRC, bits, conventional in nature. The paging signal further includes flag bits 42 utilized for other purposes.

The paging signal 32, in one embodiment, is encoded by a suitable encoding technique to facilitate its communication to a user terminal. The paging signal when received by a user terminal identified by the identifier 34 provides the user terminal with an indication of the incoming call.

When the user terminal receives the paging signal 32, an acknowledgment signal, formed of an encoded signal is transmitted back to a network station. The acknowledgment signal is derived from the TMSI or IMSI forming the identifier code 34 and the power level indicator 36 of the paging signal is used to select the encoding scheme used to encode the acknowledgment signal. When, for instance, the paging signal 32 is transmitted at a normal power level, the acknowledgment signal is encoded in one manner, and when the power level of the paging signal is boosted to be of a higher power level, the acknowledgment signal is encoded in a second manner.

In another embodiment, the user terminal generates an acknowledgment signal a plurality of times. For instance, the acknowledgment signal can be repeated five times when the paging signal is transmitted at a normal power level and is repeated eight times when the paging signal responsive to transmission of the paging signal at a boosted power level. A network station correlates the received acknowledgment signals with expected signals known to the network station to ensure that the acknowledgment signal is the correct acknowledgment to the page.

FIG. 3 illustrates again the network control center 18, transceiver 22 and user terminal 24 shown previously in FIG. 1. When a call is to be placed to the user terminal 24, the network control center initiates transmission of a paging signal which is transmitted to the user terminal 24 by way of the transceiver 22. The network control center 18 includes transceiver circuitry, here shown to be formed of a transmitter 52 and a receiver 54. The transmitter and receiver 52 and 54 are coupled to a controller 56. The controller 56 is operable to form and cause transmission of a paging signal by the transmitter 52 to the transceiver 22 to be received by the receiver 62 thereof.

The transceiver 22 is further shown to include a transmitter 64 and a controller 66. Once the signal generated by the network control center 18 is received by the receiver 62 of the transceiver 22, the controller 66 causes the transmitter 64 to transmit the paging signal 32 to the user terminal 24. The transceiver 22 thereby functions as a relay to relay on the paging signal generated at the network control center 18. The controller 66 is operative, e.g., to alter the frequency channel through which the paging signal is relayed on to the user terminal. The controllers 56 and 66 together control transmission of the paging signals and together form a control element 68.

If the user terminal 24 detects the paging signal transmitted thereto, the terminal 24 generates an acknowledgment signal 72 for transmission back to the network control center 18 by way of the acknowledgment signal is received by the receiver 62 and relayed on by the transmitter 64 to be received by the receiver 54 of the network control center 18.

The controller 56 of the network control center determines whether the received signal forms the acknowledgment signal generated by the selected user terminal 24 by a correlation process, noted previously. If so, call placement to the user terminal 24 is permitted to continue. If the controller 56 determines that the proper acknowledgment signal has not been received, the controller 56 causes retransmission of the paging signal with appropriate alteration of the value of the power level indicator 36 portion thereof. The paging signal retransmitted by the transmitter 64 is of a boosted power level to increase the likelihood that attenuation of the signal can be overcome so that the user terminal 24 receives the paging signal. In one embodiment, when retransmitted, the paging signal is boosted in power by five decibels when transmitted and retransmitted upon a normal paging channel PCH. When transmitted and retransmitted upon an HP-SMS channel, the paging system is boosted in power by seven dB. Such operation effectuates transmission of paging signals transmitted upon a regular paging channel, PCH, and also to transmit the high penetration short message service signal, as appropriate.

When the acknowledgment signal 72 is received by the receiver 54 of the network control center 18, the values of the acknowledgment signal are determined. For instance, as noted previously, correlator circuitry of the controller permits the termination of the acknowledgment signal from the user terminal 24. In one embodiment, as noted above, the user terminal 24 transmits the acknowledgment signal a plurality of times. Majority polling of evaluations of the repeated transmissions of the acknowledgment signals can be used to ensure the accuracy of the reception of the acknowledgment signal. It also helps against contention for use of the random access channel (RACH) by other users who have been paged around the same time.

Appropriate billing of the billing account associated with the user terminal 24 is also made after reception of the paging, e.g., HP-SMS, signal at the user terminal and subsequent reception at the network of the acknowledgment. As explained more fully in the aforementioned copending patent application, various service levels might be associated with the HP-SMS paging, and billing is made appropriate thereto.

Figure 3:
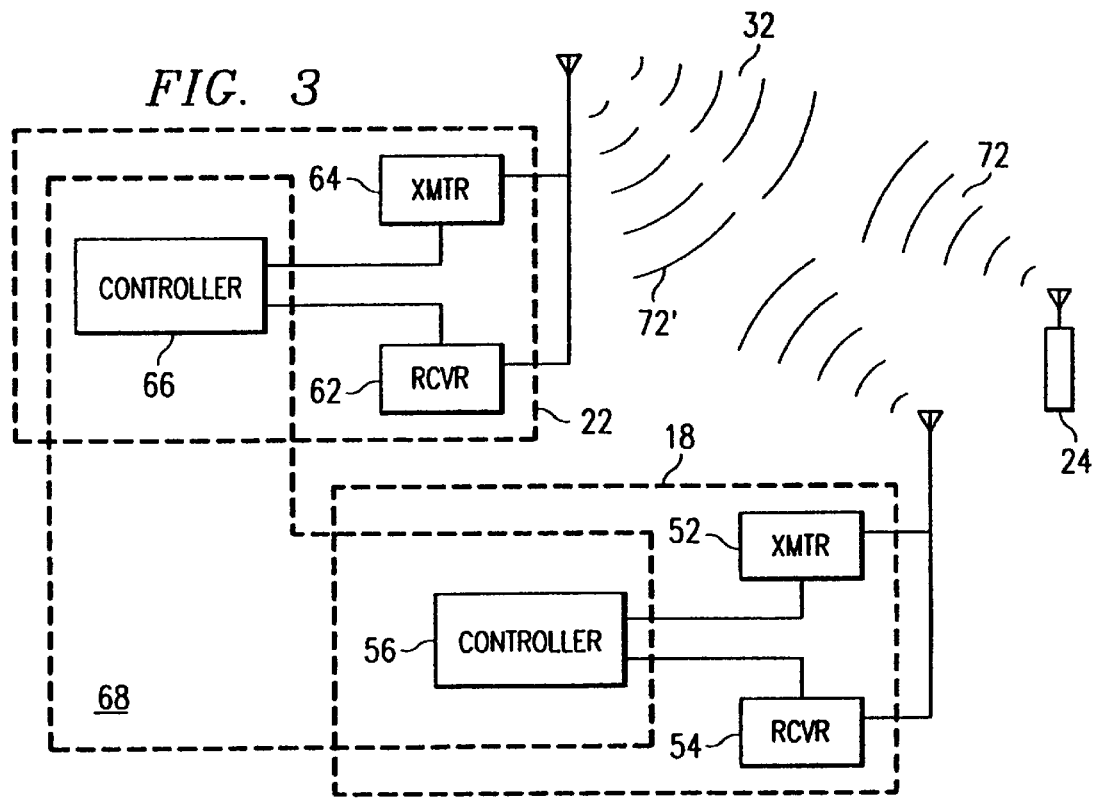
FIG. 3 illustrates in greater detail portions of the communication system shown in FIG. 1.
Figure 4A:
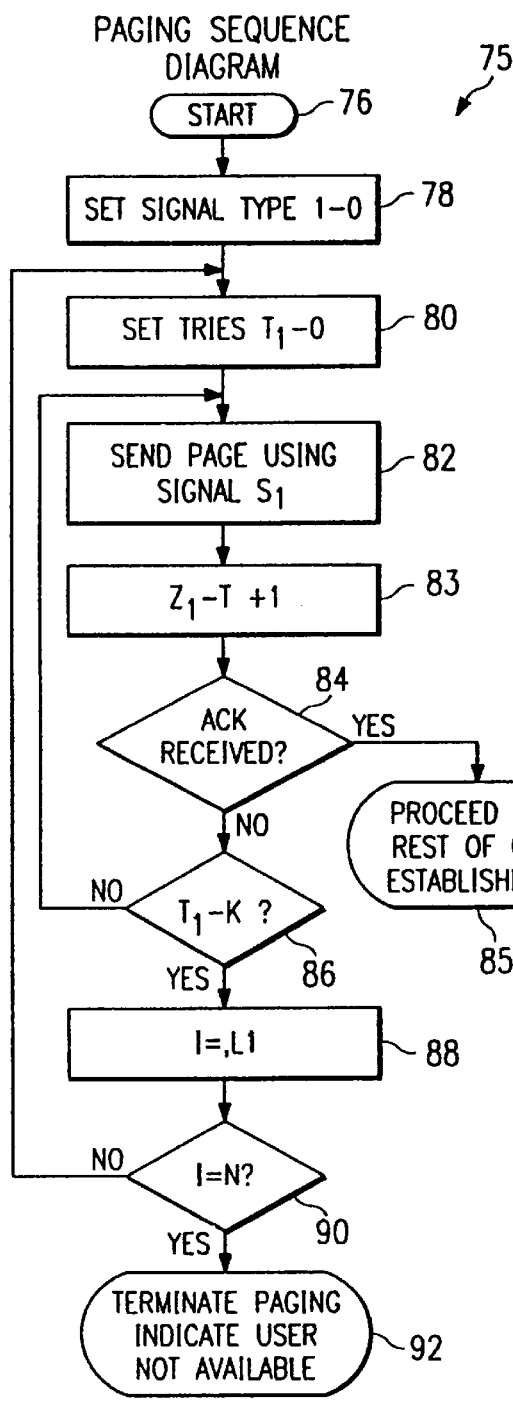
FIGS. 4A and 4B illustrate flow diagrams listing the method steps of the method of operation of an embodiment of the present invention.

FIG. 4A illustrates the method, shown generally at 75, of operation of the control circuitry 68 illustrated in FIG. 3. After entry into the program indicated by the start block 76, the margin level, i, is reset, here indicated by the block 78. In one embodiment of the present invention, paging signals can be transmitted upon a normal paging channel of either of two power levels and on the HP-SMS channel at either of two power levels. Thereby, in such embodiment, four margin levels are possible.

Then, and as indicated by the block 80, the paging-signal attempt number, t, is reset. Then, and as indicated by the block 82, the paging signal is transmitted, and, thereafter, the attempt number is incremented, as indicated by the block 83.

A decision is then made, as indicated by the decision block 84, as to whether an acknowledgment to the paging signal has been received. If so, the branch labeled yes is taken to block 85 and additional call establishment procedures are followed. Otherwise, the branch labeled no is taken to decision block 86. Additional details of the manner by which a determination is made whether or not an acknowledgment signal has been received shall be described wilfully with respect to FIG. 4B below.

After the decision at the decision block 86, a determination is made as to whether the paging signal has been transmitted and retransmitted a required number of times. If not, the branch labeled no is taken back to block 82, and the paging signal is resent. Otherwise, the branch labeled yes is taken to block 88, and the margin level of the paging signal is increased, such as by boosting the power level of the paging signal. Then, as indicated by the decision block 90, a determination is made as to whether the margin level has reached a maximum margin level. If not, the branch labeled no is taken back to block 80, the number of attempts, t, is reset, and paging signals are again transmitted. Otherwise, the branch labeled yes is taken to block 92 whereat paging is terminated as the intended user terminal appears not to be available.

Figure 4B:
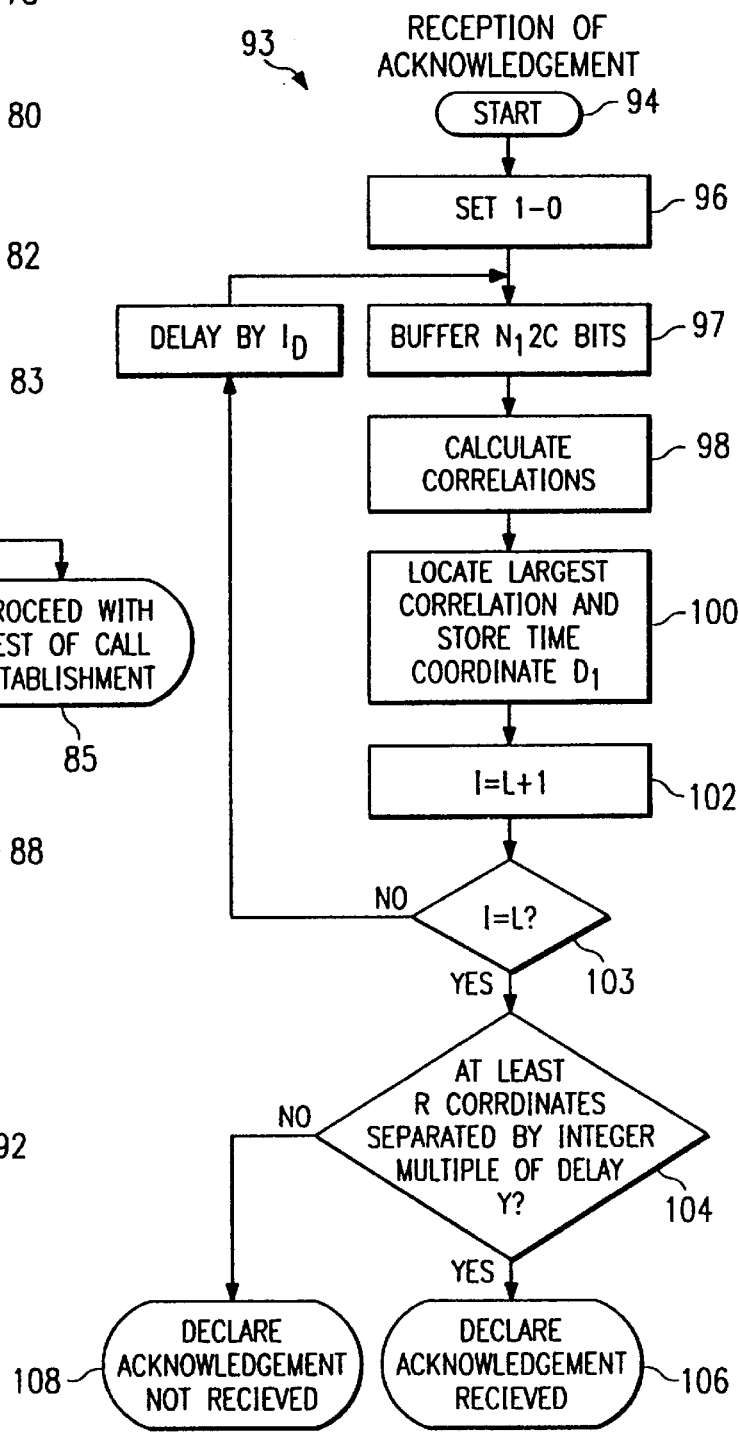

FIG. 4B illustrates the manner by which a determination is made at the decision block 84 as to whether an acknowledgment signal has been received responsive to transmission of a paging signal. First, after entry into the method, as indicated by the start block 94, a variable, j, is reset, as indicated by the block 96. Then, a sequence of bits, here of length N plus 2 G, are buffered, as indicated by the block 97. Once buffered, correlations of the buffered bits are correlated, as indicated by the block 98, with expected values of the bits. The correlation of the largest magnitude and its corresponding time coordinate is located, as indicated by the block 100, and the variable j is incremented, as indicated by the block 102.

Then, as indicated by the decision block 103, a determination is made as to whether j equals L. If not, the branch labeled no is taken to block 104 and operations are delayed by a fixed time period and then buffering at the block 97 is repeated. If the branch labeled yes is taken from the decision block 103, a determination is then made at the decision block 104 as to whether at least R coordinates are separated by an integer multiple of the fixed delay period. If so, the branch labeled yes is taken and the acknowledgment signal is declared to have been received, as indicated by the block 106. Otherwise, the branch labeled no is taken and the acknowledgment signal is declared not to have been received, as indicated by the block 108.

Figure 5:
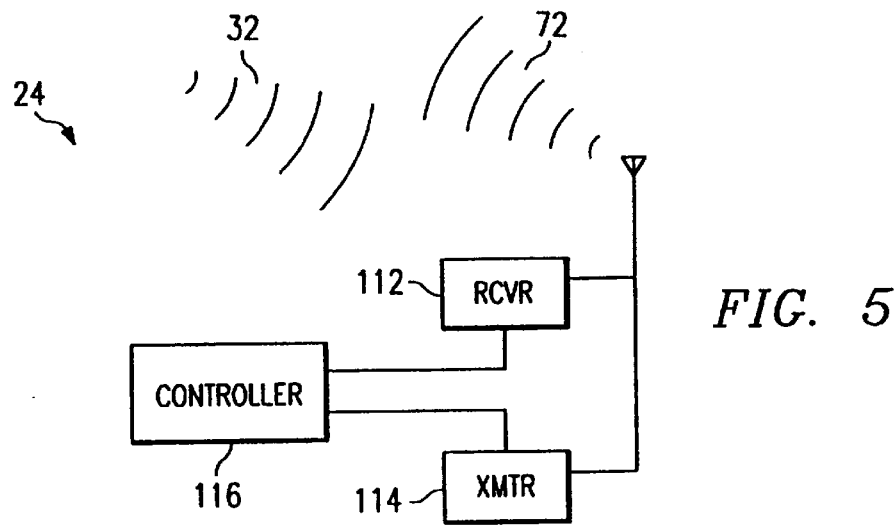
FIG. 5 illustrates in greater detail the user terminal, shown previously in FIG. 1, of an embodiment of the present invention.

FIG. 5 illustrates again the user terminal 24 shown in FIGS. 1 and 3. The user terminal 24 includes a receiver 112 and a transmitter 114; both the receiver and transmitter 112 and 114 are coupled to a controller 116 which controls their operation. The receiver 112 is operable to receive a paging signal, such as the paging signal 32 shown in FIG. 2 transmitted to the user terminal. Responsive to reception of the paging signal 32, the controller 116 causes the transmitter 114 to transmit an acknowledgment signal 72. As the power levels of signals generated by the user terminal 24 are limited, the margin of the acknowledgment signal generated by the user terminal 24 is increased by encoding the acknowledgment signal. In one embodiment, the acknowledgment signal is transmitted upon a random access channel, RACH, defined in the aforementioned ASEAN satellite-cellular communication system.

While a single-bit can be utilized to acknowledge receipt of the paging signal, the single-bit is coded by a unique sequence of a selected length, such as 128 bits. The uniqueness of the sequence is determined by an address that is transmitted as a portion of the paging message, such as selected bits extracted from the identifier 34 forming a portion of the paging signal 32. Only a few sequences are required to be reserved for the acknowledgment signal as a satellite-based transceiver, such as the transceiver 22, is able to page only a few user terminals simultaneously. For instance, sixteen sequences are adequate in the performance of such a service. Sixteen sequences are identifiable by four bits extracted from the paging signal. The sixteen sequences can be chosen, for example, to be the auto-optimal least side lobe energy sequences from the set of Gold or Kasami or Bent or M-sequences of the selected bit length. Alternately, a Hadamard sequence can be utilized, and the sequences can also be constructed to be formed of a concatenation of shortened sequence lengths.

By coding the single-bit acknowledgment by a 128-bit sequence, a processing gain of twenty-one decibels can be obtained. As the normal length margin for a traffic channel carrying four kbps voice data protected with a rate of ⅔ code is about eight decibels, the net margin of an acknowledgment signal so-created over a traffic channel is twenty-one decibels plus eight decibels minus ten log (3/2) minus three decibels due to noncoherent demodulation during operation of an embodiment of the present invention, thereby to equal twenty-four decibels. By repeating the acknowledgment signal and performing a majority logic polling, as noted previously, an even higher link margin can be formed with a corresponding additional reduction in error rate.

The use of such a long sequence which provides processing gain also mitigates errors due to attenuation and collisions with simultaneously-transmitted signals by other user terminals. The acknowledgment channel upon which the acknowledgment signals are transmitted therefore act analogous to a spread spectrum channel. Other user terminals accessing the same channel appear to be random, unspread interferers. This also allows subtractive demodulation to be performed which can be employed for decoding regular signals transmitted on such channels. That is, the spread spectrum signal is decoded then re-encoded and subtracted from the incoming signal which is then used to decode regular signals transmitted on such a channel.

In one embodiment, the sequence used to encode the acknowledgment signal is generated in accordance with a unique assignment to a particular user terminal. The paging signal to the user terminal contains a field of X bits, for example four bits, which uniquely specifies $2^x$ sequences that are to be used for the acknowledgment Only a few sequences are required to be reserved for the acknowledgment because, as noted above, only a few user terminals can be paged simultaneously. Even higher reuse of such sequences is permitted by exclusively-ORing a sequence unique to the beam sending or relaying the paging signal covering the location of the user terminal and a portion of a sequence used in the high-margin burst. If the two sequences are of dissimilar lengths, the logical operation can be performed upon a selected portions, such as the least significant bits, of the sequence of greater length.

In another embodiment, the sequence used to encode the acknowledgment signal is generated in accordance with the time in which the user terminal receives the paging signal. Again, the paging signal transmitted to the user terminal again contains a field of x bits which uniquely specifies sequences that are to be used for the acknowledgment, in a manner analogous to the above-described embodiment. Here, the x bits are derived from a paging signal group number of a multi-frame number uniquely identifying the time during which the paging signal is received.

Figure 6:
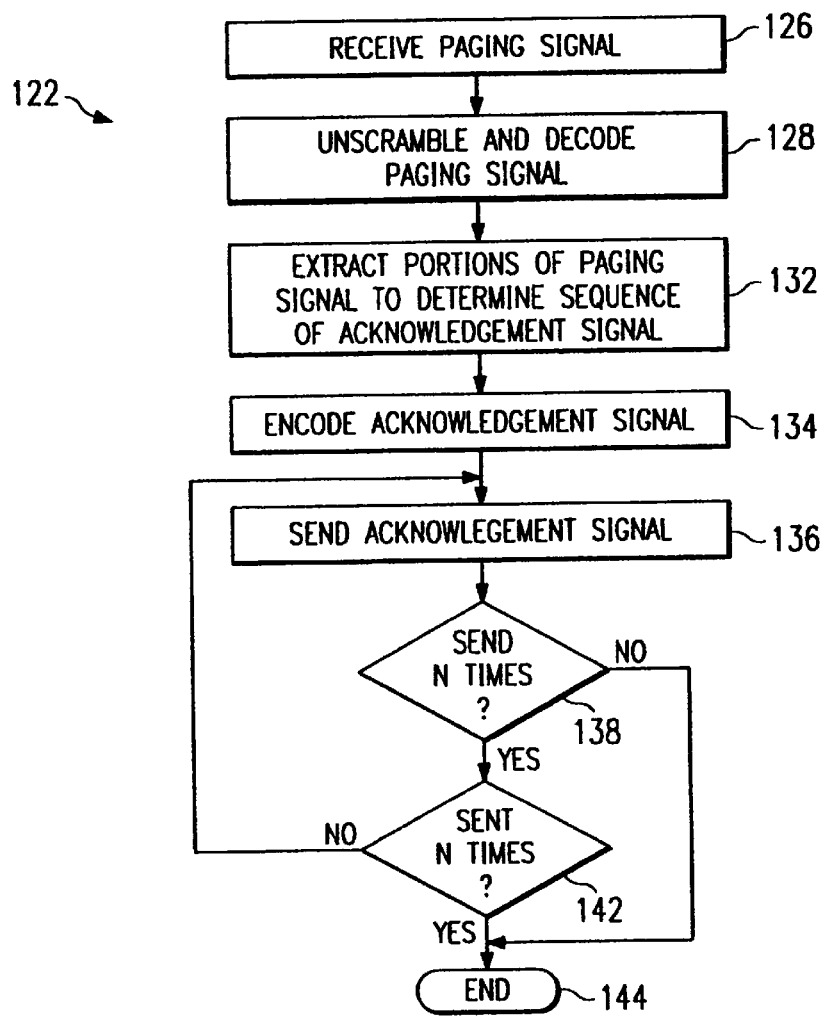
FIG. 6 illustrates a flow diagram which lists the method steps of the method of operation of the user terminal shown in FIG. 5 of an embodiment of the present invention.

FIG. 6 illustrates a method, shown generally at 122, illustrating the method of operation of the user terminal 24 according to an embodiment of the present invention. First, and as indicated by the block 126, the paging signal is received at the user terminal. Then, and as indicated by the block 128, the paging signal is and decoded.

Thereafter, and as indicated by the block 132, portions of the paging signal are extracted, and such extracted portions are utilized to determine the encoding scheme for encoding the acknowledgment signal. Once the encoding scheme is determined, and as indicated by the block 134, the acknowledgment signal is encoded and, as indicated by the block 136, transmitted.

Thereafter, and as indicated by the decision block 138, a determination is made as to whether the acknowledgment signal is to be transmitted a plurality of times. If so, the yes branch is taken to the decision block 142, and a determination is made as to whether the acknowledgment signal has been transmitted the required number of times. If not, the no branch is taken back to the block 136. Otherwise, the no branch is taken to the end block 144. And, once the acknowledgment signal has been sent the required number of times as determined at the decision block 142, a branch is also taken to the end block 144.

Operation of the present invention facilitates communication in a radiotelephonic communication system, such as a satellite-cellular communication system or a terrestrial-cellular communication system. By providing an acknowledgment signal responsive to reception of a paging signal, redundant paging is avoided and satellite power is more efficiently utilized. And, because the margin of the acknowledgment signal is increased without increasing the power level of the acknowledgment signal, communication of the acknowledgment signal can be effectuated even when the acknowledgment signal must be transmitted upon a transmission channel exhibiting high levels of attenuation.

The previous descriptions are of preferred examples for implementing the invention, and the scope of the invention should not necessarily be limited by this description. The scope of the present invention is defined by the following claims.

What is claimed is:

1. A method for initiating communication in a cellular satellite communication system having at least a satellite-based transceiver and a user terminal, said method comprising the steps of:

paging the user terminal with a paging signal transmitted by the satellite-based transceiver, the paging signal including an indicator within the paging signal of a margin level of the paging signal;

returning an acknowledgment signal generated at the user terminal a selected number of times in response to the indication of the margin level of the paging signal to the satellite-based transceiver responsive to reception by the user terminal of the paging signal for acknowledging reception by the user terminal of the paging signal, the selected number of times responsive to the indicator of the margin level of the paging signal transmitted within the paging signal during said step of paging.

2. A communication initiation method for initiating communication by a first radio communication station with a second radio communication station, said method comprising the steps of:

transmitting a paging signal from the first radio communication station upon a forward-link channel, the paging signal transmitted at a first margin level, and the paging signal including a margin level indicating portion for indicating the margin level at which the paging signal is transmitted; and retransmitting the paging signal from the first radio communication station upon the forward-link channel if the second radio communication station fails to acknowledge reception of the paging signal transmitted during said steps of transmitting within a selected time period, the paging signal retransmitted at a second margin level, the second margin level greater in magnitude than the first margin level and the paging signal again including the margin level indicating portion for indicating the margin level at which the paging signal is retransmitted;

generating an acknowledgment signal at the second radio communication station responsive to reception thereat of the paging signal transmitted thereto, wherein the acknowledgment signal comprises a signal encoded by a selected encoding scheme, the selected encoding scheme dependent on the margin level indicated in the margin level indicating portion; and transmitting the acknowledgment signal back to the first radio communication station upon a reverse-link channel in a manner responsive to the margin level indicated in the margin level indicating portion of the paging signal received at the second radio communication station.

3. The communication initiation method of claim 2 wherein the paging signal comprises a digitally-encoded signal and wherein the power level indicating portion comprises at least a one-bit coded portion thereof.

4. The communication initiation method of claim 2 wherein the paging signal further comprises an identifier code portion, the identifier code portion of values containing an identifier code which uniquely identifies the second radio communication station.

5. The communication method of claim 2 wherein the first radio communication station comprises a satellite transceiver of a satellite-cellular communication system, wherein the second radio communication station comprises a user terminal of a satellite-cellular communication system, and wherein the paging signals transmitted on the forward-link channel during said steps of transmitting and retransmitting are transmitted upon a regular paging channel defined for regular paging in the satellite-cellular communication system.

6. The communication initiation method of claim 2 wherein the first radio communication station comprises a satellite transceiver of a satellite-cellular communication system, wherein the second radio communication station comprises a user terminal of a satellite-cellular communication system, and wherein the paging signals comprise high penetration short message service signals defined in the satellite-cellular communication system.

7. The communication initiation method of claim 2 wherein the reverse link channel upon which the acknowledgment signal is transmitted back to the first radio communication station comprises a random access burst channel defined in a satellite-cellular communication system.

8. The communication initiation method of claim 2 wherein said step of transmitting the acknowledgment signal back to the first radio communication station comprises transmitting a selected number of bursts upon the reverse link channel, the selected number of burst dependent upon the margin level indicated in the margin level indicating portion.

9. The communication initiation method of claim 8 wherein the consecutive bursts transmitted during said step of transmitting are separated by selected time periods.

10. The communication initiation method of claim 2 wherein the second radio communication station is assigned with a unique assignment value uniquely identifying the second radio communication station and wherein said selected encoding scheme further utilizes the unique assignment value to encode the acknowledgment signal.

11. The communication initiation method of claim 2 wherein said step of generating the acknowledgment signal further comprises determining a time at which the paging signal is received at the second radio communication station and wherein said selected encoding scheme further utilizes the time at which the paging signal is received to encode the acknowledgment signal.

12. The communication initiation method of claim 2 comprising the further step of billing a billing account associated with the second radio communication station responsive to detection at the first radio communication station of the acknowledgment signal transmitted back to the first radio communication station.

13. The communication initiation method of claim 2 wherein said paging signals transmitted by the first radio communication station during said steps of transmitting the paging signal and retransmitting the paging signal further comprise an acknowledgment-encoding scheme portion for indicating to the second radio communication station the selected encoding scheme by which the acknowledgment signal is to be encoded.

14. The communication initiation method of claim 2 wherein the first margin level comprises a first power level, the margin level indicating portion comprises a power level indicating portion, and the second margin level comprise a second power level.

15. The communication initiation method of claim 2 wherein the first margin level comprises a first level of encoding, the margin level indicating portion comprises an encoding-level indicating portion, and the second margin level comprises a second level of encoding, the paging signal transmitted at the second level of encoding of a greater margin than the paging signal transmitted at the first level of encoding.

16. In a radio communication system having a first radio communication station and a second radio communication station, a combination with the first radio communication station of communication initiation circuitry for initiating communication with the second radio communication station, said communication initiation circuitry comprising:

a transmitter for transmitting a paging signal of a selected margin level using a first encoding scheme upon a forward-link channel to the second radio communication station;

a controller coupled to receive indications of an acknowledgment signal transmitted thereto acknowledging reception at the second radio communication station of the paging signal, said controller for detecting times in which the second radio communication station fails to acknowledge reception of the paging signal, said controller further for causing said transmitter to retransmit the paging signal at an increased margin level using a second encoding scheme responsive to times detected thereat in which the second radio communication station fails to acknowledge the receipt on of the paging signal.

17. The communication initiation circuitry of claim 16 wherein said controller is positioned remote from said transmitter and coupled thereto by way of a radio link.

18. In a radio communication system having a first radio communication station and second radio communication station, the first radio communication station operable to transmit a paging signal to the second radio communication station, a combination with the second radio communication station of circuitry for responding to the paging signal, said circuitry comprising:

a controller coupled to receive indication so reception at the second radio communication station of the paging signal transmitted hereto by the first radio communication station, said controller for determining a margin level indicator within a selected portion of the paging signal and for forming an acknowledgment signal, encoded in a manner responsive to the margin level indicator; and a transmitter coupled to receive the acknowledgment signal formed by said controller, said transmitter for transmitting the acknowledgment signal to the first radio communication station to acknowledge, thereby, reception of the paging signal.

19. A communication initiation method for initiating communication by first radio communication station with a second radio communication station, said method comprising the steps of:

transmitting a paging signal from the first radio communication station upon a forward communication link, the paging signal transmitted at a first margin level by using a first level of encoding, and the paging signal including an encoding level indicating portion for indicating the encoding level at which the paging signal is transmit;

retransmitting the paging signal from the first radio communication station upon the forward link channel if the second radio communication station fails to acknowledge reception of the paging signal transmitted during said step of transmitting within a selected time period, the paging signal re-transmitted at a second margin level by using a second level of encoding, the second margin level greater in magnitude than the first margin level and the paging signal again including the encoding level indicating portion for indicating the second level of the encoding at which the paging signal is re-transmitted.

* * * * *